United States Patent
Yamashita et al.

(10) Patent No.: US 7,099,730 B2
(45) Date of Patent: Aug. 29, 2006

(54) TERMINAL TABLE UNIT

(75) Inventors: Masanori Yamashita, Kishima-gun (JP); Hiroshi Hashimoto, Kashima (JP); Masaru Imoto, Numazu (JP); Hajime Izutani, Mishima (JP); Fumihiko Okumura, Hiroshima (JP); Tomoaki Yoshikawa, Hiroshima (JP); Hirofumi Iwanaga, Kishima-gun (JP)

(73) Assignee: OMRON Corporation, Kyoto (JP)

( * ) Notice: Subject to any disclaimer, the term of this patent is extended or adjusted under 35 U.S.C. 154(b) by 260 days.

(21) Appl. No.: 10/799,929

(22) Filed: Mar. 12, 2004

(65) Prior Publication Data
US 2004/0233697 A1    Nov. 25, 2004

(30) Foreign Application Priority Data
Mar. 14, 2003    (JP) .............................. 2003-069469

(51) Int. Cl.
*G06F 19/00*    (2006.01)
*G06F 7/00*     (2006.01)
*G06F 11/00*    (2006.01)

(52) U.S. Cl. ................. 700/110; 700/109; 700/111; 700/79; 700/80; 701/35; 714/25; 714/48

(58) Field of Classification Search ............ 700/110, 700/109, 111, 79, 80, 21, 34, 35; 340/438, 340/441; 714/25, 48, 57
See application file for complete search history.

(56) References Cited

U.S. PATENT DOCUMENTS

| | | | |
|---|---|---|---|
| 5,025,384 A * | 6/1991 | Teranishi et al. ........... 700/110 |
| 5,461,570 A * | 10/1995 | Wang et al. ................. 700/110 |
| 6,324,450 B1 * | 11/2001 | Iwama ........................ 701/35 |
| 6,587,042 B1 * | 7/2003 | Tabata et al. ............... 340/432 |
| 6,701,259 B1 * | 3/2004 | Dor et al. ..................... 702/35 |
| 2003/0023340 A1 * | 1/2003 | Kitamoto et al. ........... 700/121 |

FOREIGN PATENT DOCUMENTS

| | | |
|---|---|---|
| JP | 60-091753 | 5/1985 |
| JP | 2003-022116 | 1/2003 |
| KR | 100156302 B1 | 7/1998 |

* cited by examiner

*Primary Examiner*—Anthony Knight
*Assistant Examiner*—Thomas Pham
(74) *Attorney, Agent, or Firm*—Beyer Weaver & Thomas LLP (57) ABSTRACT

A terminal table unit is associated with an output apparatus such as valves and solenoids and an input apparatus such as switches and includes not only a main body with a control device and a memory device but also a cassette with a memory medium that is detachably attached to the main body. The control device receives input data from the input apparatus for controlling the output apparatus and drives the output apparatus according to the received input data. The received input data are temporarily stored in the memory device in specified units. When the input data are found to include abnormal data, the control device causes data stored in the memory device to be transferred to the memory medium of the cassette such that the memory cassette can be removed and the abnormal data stored on the memory medium can be analyzed elsewhere.

14 Claims, 7 Drawing Sheets

TERMINAL TABLE UNIT

BACKGROUND OF THE INVENTION

This invention relates to a terminal table unit that serves to receive input data from an external input device such as a proximity switch for relaying between a control device such as a controllable programmer (PLC) and an external output device such as a solenoid for monitoring this external output device and further to control the external output device on the basis of such input data and in response to a command from the control device.

There is a demand for reducing the down-time as much as possible when a production line, for example, is stopped due to an abnormal condition. When such an abnormal condition occurs, say, in a production line, the usual routine is for a maintenance manager on the site to investigate the parts considered to be causing the abnormal condition and to replace or to repair components at the parts considered to be in an abnormal condition. If the production line operates correctly after such replacement or repair, the routine is ended as having been completed.

Figure 12:
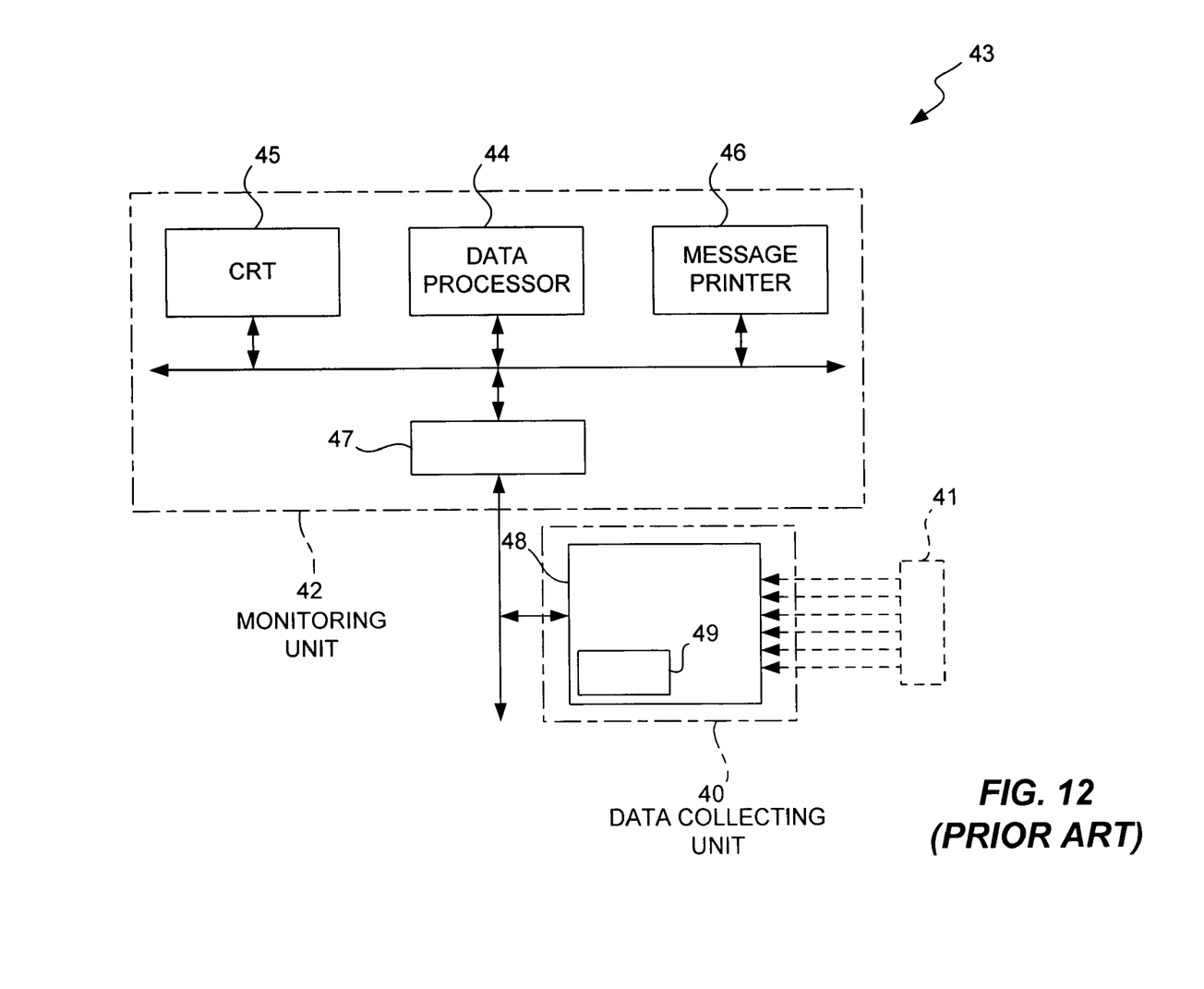
FIG. 12 is a schematic block diagram of a prior art remote monitoring system.

FIG. 12 shows a prior art remote monitoring system 43 described in Japanese Patent Publication Tokkai 2002-73432, adapted to monitor a target apparatus 41 by using a data collecting unit 40 to collect detection signals outputted from the target apparatus 41 and supplying the collected detection signals to a monitoring unit 42 while the monitoring unit 42 is normally functioning. If the monitoring unit 42 is not functioning normally, the collected detection signals are temporarily saved and then supplied to the monitoring unit 42 when the latter returns to the normal condition so as to restart the monitoring of the target apparatus 41. In FIG. 12, numeral 44 indicates a data processor, numeral 45 indicates a CRT monitoring device, numeral 46 indicates a message printer, numeral 47 is a gateway device, numeral 48 indicates an I/O controller and numeral 49 indicates a memory.

If a user repairs or replaces a component believed to have been the cause of an abnormal condition and the production line begins to operate normally thereafter, the work is believed to have been completed but there are situations where the component which has been repaired or replaced was not the major cause of the abnormal condition although the production line happens to start operating seemingly in a normal fashion. In such a situation, since the real cause of the abnormal condition has not been removed, the same trouble is likely to recur shortly thereafter, say, again only a few months later.

From the point of view of safety, it is desirable to be able to recognize a sign or a symptom of an on-coming abnormal condition but it is difficult to bring back a stopped condition due to an abnormality. Since the sequence of events immediately before such an abnormal condition cannot usually be replayed, it is not possible to analyze them to take any appropriate measures.

It may be proposed to form a network system including units for input and output such that data can be exchanged among them but such a method has its own problem that once such a network has been formed, the structure of the network itself as well as its wiring will have to be changed whenever a device is changed and hence the loss may become significantly large.

SUMMARY OF THE INVENTION

It is therefore an object of this invention in view of the above to provide a terminal table unit which makes it easier to analyze abnormality data for safety on the basis of input data received from external input devices without forming a network structure or making a change in such a network structure.

A terminal table unit according to this invention may be characterized as comprising a main body including a control device and a memory cassette which includes a memory medium and is detachably attached to the main body, wherein the control device is adapted to receive input data from an input apparatus for controlling an output apparatus such as valves and solenoids and to drive the output apparatus according to the received input data (and control signal based on the input data) and wherein the control device serves to cause the input data from the input apparatus to be stored on the memory medium. In the above, it may be a PLC that outputs the control signal based on the input data and it may be switches such as proximity switches, photoelectric switches and abnormality-detecting switches that output the "input data" for controlling the output apparatus.

With a terminal table unit thus structured, if there is an abnormality in the input data, portions of both normal and abnormal data come to be stored on the memory medium of the cassette and hence the user can remove the cassette from the main body to have their time charts outputted by means of a computer. Thus, the abnormal data can be easily analyzed with the cassette removed from the main body and connected to a computer and the production line or the like being controlled can be repaired dependably.

For making the detachable connection, the main body may be provided with a connector such that the memory cassette is connected to the main body through such a connector. Once disconnected, the memory cassette may be connected to a computer or the like such that time charts for the normal and abnormal data can be outputted for an easier analysis of the abnormal condition.

The main body may further include a memory device for periodically storing a new portion of the received input data (or the control signal based thereon). The memory medium of the cassette may be adapted to receive input data taken in from this memory device.

The control signal based on the input data may normally be a periodic signal and the control device may be adapted, when abnormal data are detected in the input data, to use the detected abnormal data as a trigger and to thereby read out from the memory device and cause to be stored on the memory medium a portion of a specified number of periods of the input data including a portion before the trigger is detected. In such an embodiment, the portion of the input data to be stored may be selected to include a portion corresponding to one period of the abnormal data and another portion corresponding to one period of the normal data, that is, the input data before the trigger is detected. In other words, the memory device is adapted to store the input data in units of two periods under a control of the control device.

The terminal table unit of this invention generally serves as a relay between an apparatus such as a PLC connected to a network and switches such as proximity switches and photoelectric switches and the control device may be adapted to monitor the number of times the pulse signal based on the input data is switched on or the cumulative sum of the time length during which the pulse signal is switched on.

In the description of the invention that follows, the input data and the control data based thereon are often both referred to as the "input data" for the convenience of description wherever no confusion is expected thereby.

DETAILED DESCRIPTION OF THE INVENTION

Figure 1:
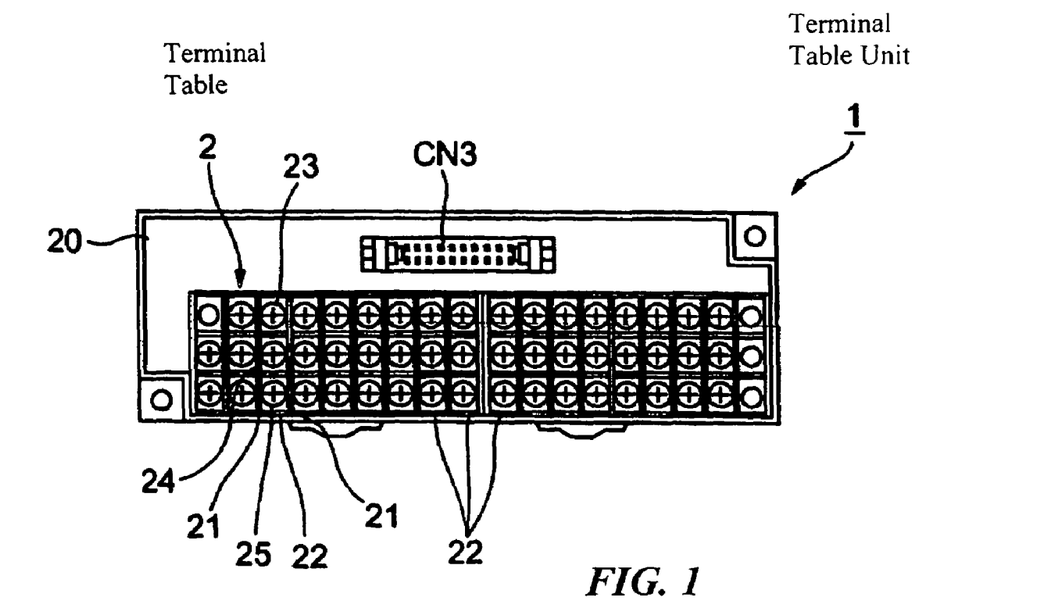
FIG. 1 is a plan view of a terminal table unit embodying this invention.
Figure 2:
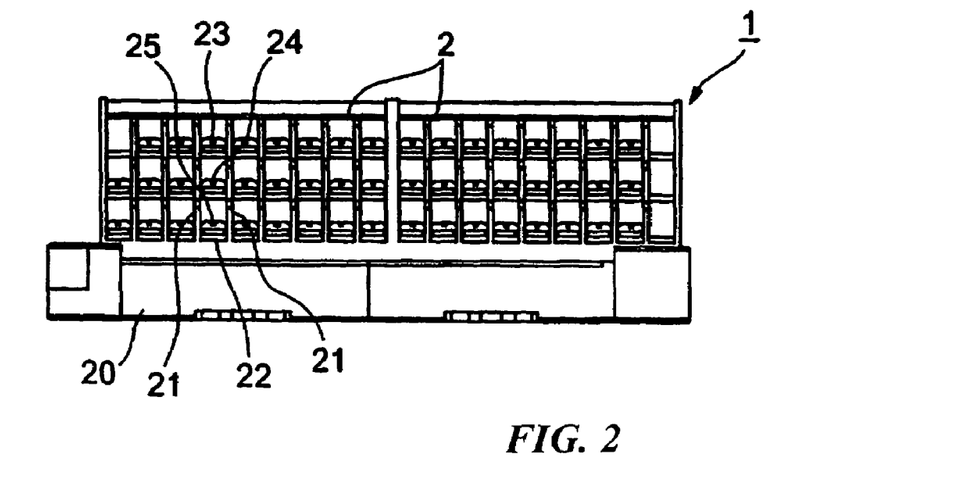
FIG. 2 is a front view of the terminal table unit of FIG. 1.
Figure 4:
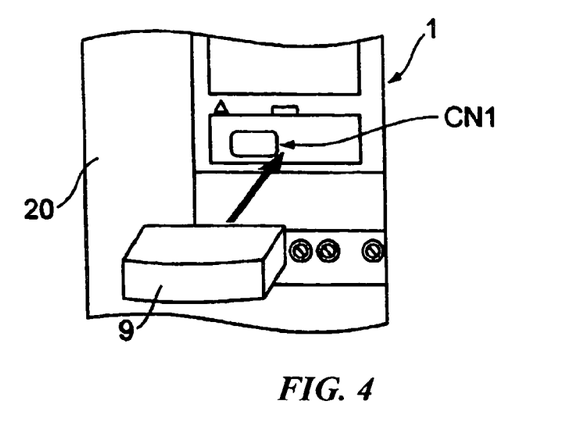
FIG. 4 is a schematic drawing of the attachment part of the terminal table unit of FIGS. 1 and 2 for a memory cassette.
Figure 5:
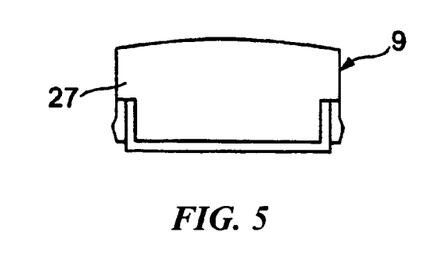
FIG. 5 is a plan view of the memory cassette.
Figure 6:
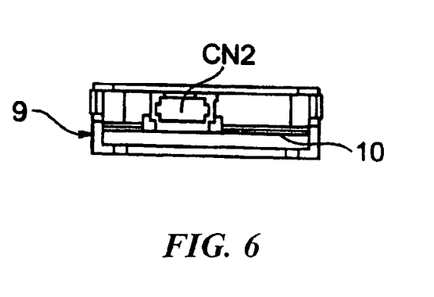
FIG. 6 is a back view of the memory cassette.
Figure 7:
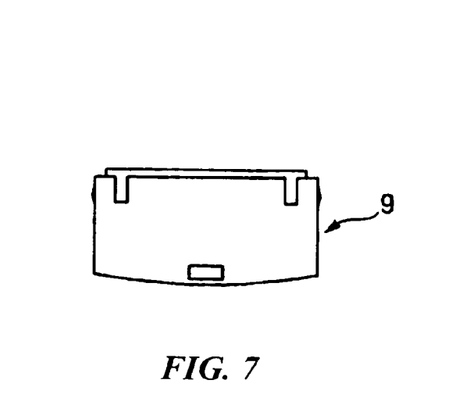
FIG. 7 is a bottom view of the memory cassette.
Figure 8:
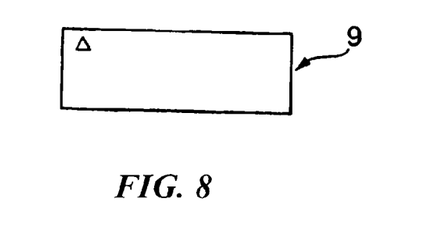
FIG. 8 is a front view of the memory cassette.

The invention is described next by way of an example with reference to FIG. 1 which is a plan view, FIG. 2 which is a front view of a terminal table unit 1 embodying this invention and FIG. 4 for schematically showing its attachment part. As shown in FIGS. 1 and 2 as well as FIG. 4, the terminal table unit 1 has a main body 20 with a terminal table 2, a cassette-connecting connector CN1 and an on-table connector CN3 on its upper surface portion. Inside the terminal table 2 are many terminal attachment sections 22 formed mutually separated by partitions 21 in its longitudinal direction. A positive connection terminal 23, a signal connection terminal 24 and a negative connection terminal 25 are mounted in a row inside each of these terminal attachment sections 22.

Figure 3:
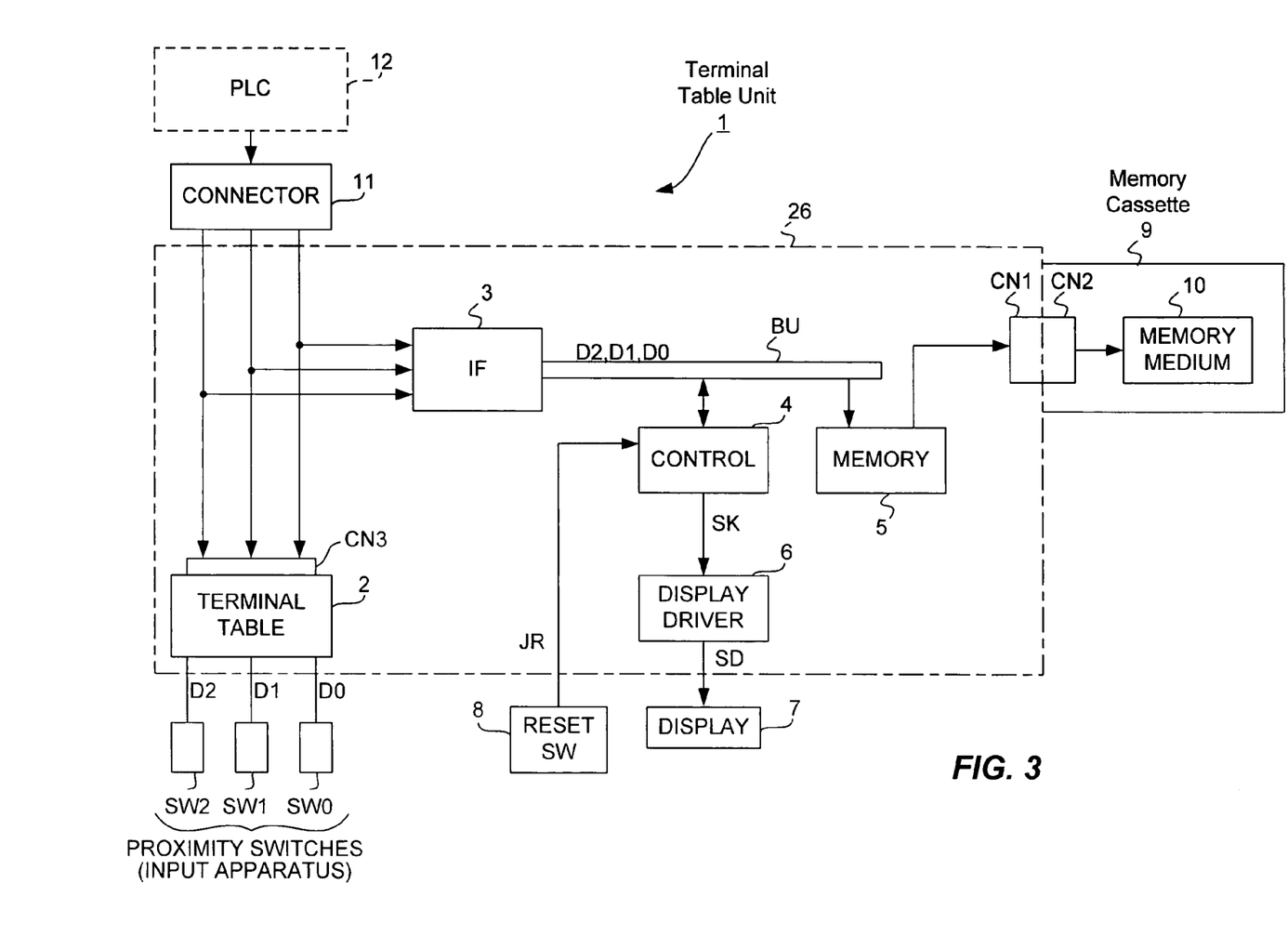
FIG. 3 is a block diagram of the control unit of the terminal table unit of FIGS. 1 and 2.

As shown in FIG. 3, the main body 20 is provided with a display device 7 and a reset switch 8. As shown in FIG. 4, a memory cassette 9 is connected to the cassette-connecting connector CN1.

Inside the terminal table unit 1 is a control unit 26 which is provided with an insulator interface (IF) 3, a control device 4, a memory device 5 and a display driver 6, as shown in FIG. 3. The insulator interface 3 comprises a function of a photo-coupler or the like for isolating the power source and an interface function for guiding input data D0, D1 and D2 (to be explained below) onto an internal bus BU such that the input data D0, D1 and D2 will be electrically isolated and transmitted through the internal bus BU to the control device 4.

The control device 4 is basically a microprocessor and is adapted to carry out various processes and comparisons, for example, for causing the input data D0, D1 and D2 supplied through the internal bus BU to be stored in the memory device 5 at a specified frequency such as in units of two periods.

The control device 4 is also adapted so as, when abnormal data are detected, to read out a total of two periods of data, which are one period of the abnormal data stored in the memory device 5 and another period of normal data stored prior to the abnormal data, and to cause them to be stored on the memory medium 10 of the memory cassette 9. When abnormal data are detected, the control device 4 also serves to supply a start signal SK to the display driver 6 and to thereby start up the display driver 6.

The control device 4 may further be adapted to compare a two-period portion of the input data D0, D1 and D2 supplied through the internal bus BU with a two-period portion of basic data with specified patterns preliminarily set in the memory device 5 and to judge that the input data are normal or abnormal respectively if they agree or disagree.

The memory device 5 comprises a rewritable device such as an EEPROM or a RAM and is adapted to store the input data D0, D1 and D2 supplied through the internal bus BU at a specified frequency such as in units of two periods under the control of the control device 4.

The memory device 5 is also adapted so as, when the control device 4 has detected abnormal data, to transfer a two-period portion of data including one one-period portion of input data including stored abnormal data and another one-period portion of normal input data to the memory medium 10 under the control of the control device 4.

The display driver 6 is provided both with the function of driving the display device 7 and with the function of a sound driver and is adapted to output a display signal SD to the display device 7 on the basis of the start signal SK supplied from the control device 4.

The display device 7 comprises a light-emitting diode (LED) and a speaker and is adapted to display abnormal data and to output a vocal message on the abnormality on the basis of the display signal SD supplied from the display driver 6.

The reset switch 8 may comprise a push button and is to be operated upon when it is desired to stop the display and/or the vocal message regarding an abnormal condition by supplying a reset signal JR to the control device 4.

As shown in FIGS. 5–8, the memory cassette 9 has a main body 27 provided with a connector CN2 and the memory medium 10 such as an EEPROM connected to the connector CN2. The memory medium 10 is for the purpose of storing a total of two-period portion of the input data, that is, a one-period portion of abnormal data from the input data D0, D1 and D2 and another one-period portion of normal data stored prior to the abnormal data.

Figure 10:
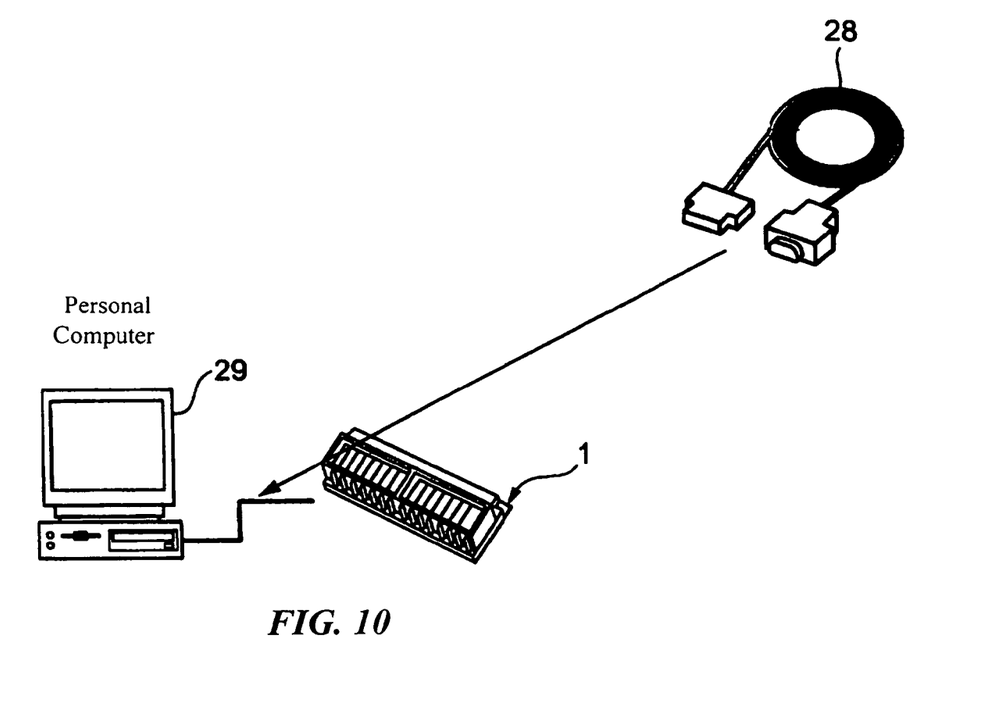
FIG. 10 is a schematic diagram for showing the memory cassette connected to a personal computer by means of a tool cable.

The memory cassette 9 is portable, when its connector CN2 is removed from the cassette-connecting connector CN1. If a tool cable 28 shown in FIG. 10 is used to connect it to a personal computer 29, time charts of the abnormal and normal data may be displayed on its screen for the analysis of the abnormal data.

Figure 9:
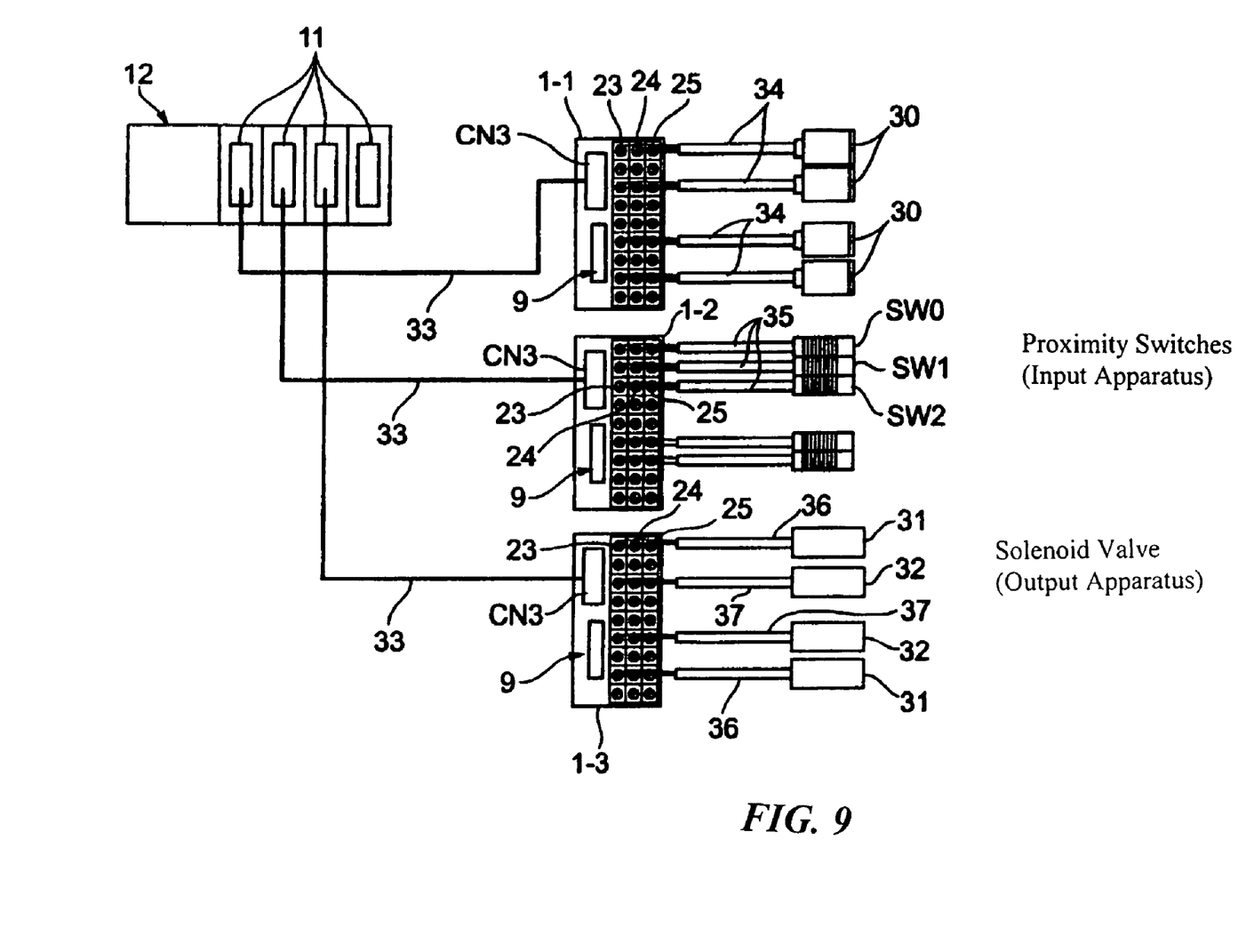
FIG. 9 is a block diagram of a monitoring system for a production line using terminal table units embodying this invention.

FIG. 9 shows a monitoring system for monitoring a production line by means of a terminal table unit 1 (1-1, 1-2, 1-3, etc.) embodying this invention, together with a PLC (programmable logic controller) 12 serving as a control apparatus, photoelectric switches 30 and proximity switches SW0, SW1, SW2, etc. serving as external input apparatus, and solenoids 31 and valves 32 serving as external output apparatus. The PLC 12 is connected to each of the terminal table units 1 by connecting each connector 11 on the part of the PLC 12 to the connector CN3 of each of the terminal table units 1 by means of a cable 33.

According to the example shown in FIG. 9, terminal table unit 1 (1-1) is connected to each of photoelectric switches 30 by connecting one end of each of connection cables 34 of the photoelectric switches 30 to the positive connection terminal 23, the signal connection terminal 24 and the negative connection terminal 25 of the terminal table 2. The terminal table unit 1 (1-2) is connected to proximity switches SW0, SW1, SW2, etc. by connecting one end of each of connecting cables 35 of the proximity switches SW0, SW1, etc. to the positive connection terminal 23, the signal connection terminal 24 and the negative connection terminal 25 of the terminal table 2. The terminal table unit 1 (1-3) is connected to solenoids 31 and valves 32 similarly by connecting one end of each of connecting driver cables 36 and 37 respectively of one of the solenoids 31 and the valves 32 to the positive connection terminal 23, the signal connection terminal 24 and the negative connection terminal 25 of the terminal table 2.

Operations of this monitoring system will be described next by way of an example where the proximity switches SW0, SW1 and SW2 are monitoring the solenoids 32.

As the terminal table unit 1 receives input data D0, D1 and D2 from the proximity switches SW0, SW1 and SW2 through the connectors 11 of the PLC, these input data D0, D1 and D2 are electrically isolated by the insulation interface 3 and guided through the inner bus BU to the control device 4. These input data D0, D1 and D2 are stored by the control device 4 in the memory device 5 at a specified frequency such as in units of two periods.

Figure 11A:
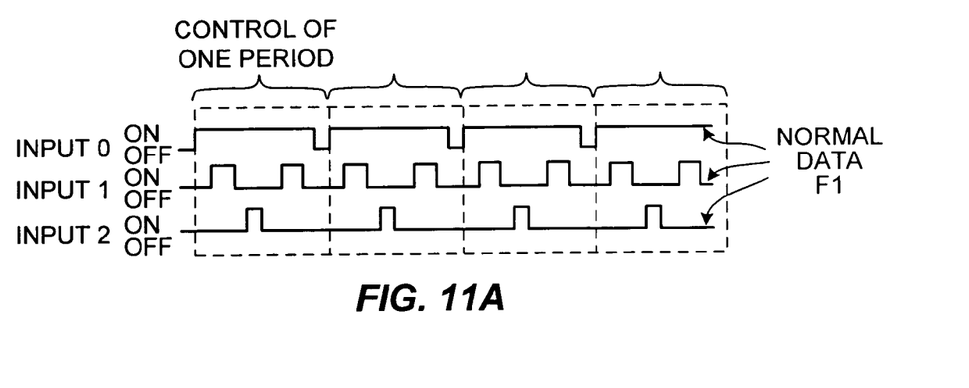
FIGS. 11A an 11B, together referred to as FIG. 11, are time charts of the input data respectively when the input data do not and do include abnormal data.
Figure 11B:
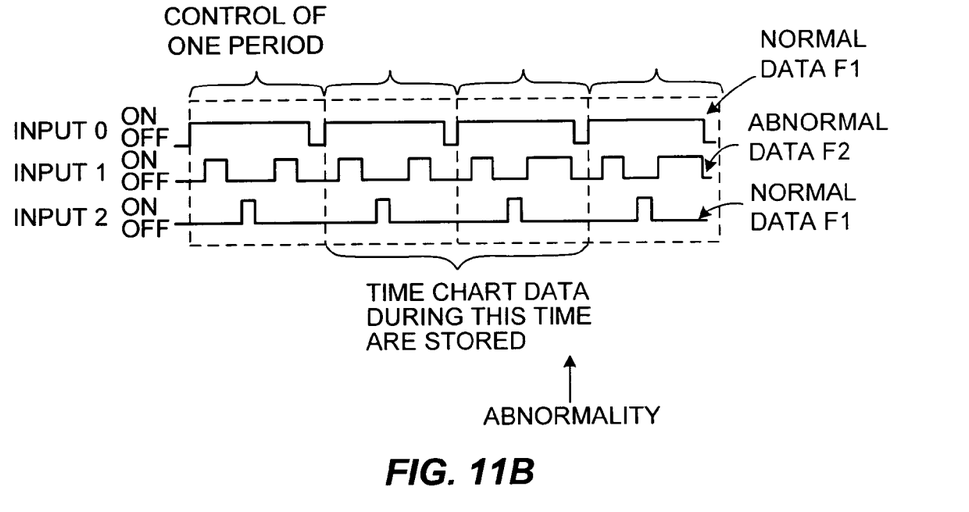

If these input data D0, D1 and D2 are normal data F1, they are signals that repeat a same pulsed waveform at a constant frequency as shown in FIG. 1A. If input data D1 become abnormal, the waveform for input data D1 may change as shown in FIG. 11B from the moment when there is a trigger ("abnormality trigger") indicative of the occurrence of an abnormal condition, the width of the pulse changing from the moment of the trigger.

When abnormal data F2 are detected, the control device 4 treats the abnormal data F2 as the abnormality trigger T and starts the process of reading out the input data over specified periods including both before and after the occurrence of the abnormality trigger T and causing them to be stored in the memory medium 10 of the memory cassette 9. In the example shown in FIG. 11B, the "specified periods" are the two periods of the input data which are the total of one period including the abnormal data F2 and another period that is one period before the input data belonging to the abnormal data F2 and includes the normal data F1 stored in the memory device 5.

The control device further serves to compare the two-period portion of the input data D0, D1 and D2 with basic (reference) data with specified patterns preliminarily stored in the memory device 5. If they match, it is concluded that the input data D0, D1 and D2 are normal and if they do not match, the conclusion is that the input data D0, D1 and D2 are abnormal.

In addition, the control device 4 operates, upon detecting the abnormal data F2, to supply the start signal SK to the display driver 6 to start up the display driver 6. Upon receiving this start signal SK supplied from the control device 4, the display driver device 6 serves to output the display signal SD to the display device 7, causing the display device 7 to output the abnormal data F2 by way of display and/or voice and the production line to stop its operations.

Thus, the memory medium 10 of the memory cassette 9 stores a two-period portion of the input data, including a one-period portion of the abnormal data F2 and another one-period portion of the normal data F1. The memory cassette 9 is then separated from the terminal table unit 1 by disengaging the connectors CN1 and CN2 from each other and is connected to the personal computer 29 by means of the tool cable 28, as shown in FIG. 10. The user can now operate on the personal computer 29 so as to display the time charts of the abnormal data F2 and the normal data F1 stored on the memory medium 10 of the memory cassette 9 on its screen and to thereby analyze the abnormal data F2. On the basis of such analyses, the part of the production line causing the abnormality is identified and corrected and the operation of the production line is restarted.

The control unit 26 may be adapted to monitor some other feature of the input data D0, D1 and D2 for the purpose of maintenance. In the example shown above, the input data D0, D1 and D2 are pulse signals from proximity sensors, being switched on and off. For example, the control unit 26 may be adapted to monitor the switch-on frequency (or the number of times a pulse signal is switched on) or the cumulative length of time during which control pulse signal based on the input data is switched on such that the occurrence of an abnormal condition in the production line can be monitored through such maintenance data.

Although an example with three proximity switches SW0, SW1 and SW2 was described as an example of this invention, the number of proximity switches is not intended to limit the scope of the invention. The invention is equally applicable in the case of photoelectric switches or switches of other kinds such as stop switches.

In summary, since both abnormal and normal data are stored on the memory medium of the memory cassette when there is an abnormality in the input data, the user of this invention can simply remove the memory cassette from main body of the table unit and use a computer or the like to output time charts of the normal and abnormal outputs so as to carry out an analysis of the abnormal data. Thus, abnormal data can be analyzed and the cause of abnormality can be detected such that the production line or the like can be reliably repaired.

What is claimed is:

1. A terminal table unit comprising:
   a main body having a surface with a connector connecting to a control device and a terminal table connecting to input and output apparatus; and
   a memory cassette which includes a memory medium and is detachably attached to said main body;
   said control device being adapted to receive input data from the input apparatus for controlling the output apparatus and to drive said output apparatus according to said received input data, said control device serving to cause said input data from said input apparatus to be stored on said memory medium.

2. The terminal table unit of claim 1 wherein said main body has a connector and said memory cassette is connected to said main body through said connector.

3. The terminal table unit of claim 1 wherein said main body further includes a memory device, said control device being adapted to cause said memory device to periodically store new portions of said input data.

4. The terminal table unit of claim 3 wherein said memory medium of said cassette stores input data taken in from said memory device.

5. The terminal table unit of claim 3 wherein said input data are a periodic signal and said control device is adapted, when abnormal data are detected in said input data, to use said abnormal data as a trigger and to thereby read out from said memory device and cause to be stored on said memory medium a portion of a specified number of periods of said input data including a portion of said input data before said trigger is detected.

6. The terminal table unit of claim 5 wherein said specified number of periods of input data includes one period of said abnormal data and one period of said input data before said trigger is detected.

7. The terminal table unit of claim 5 wherein said memory device is adapted to store said input data in units of two periods under a control of said control device.

8. The terminal table unit of claim 1 wherein said input apparatus includes a PLC connected to a network and switches, said terminal table unit serving as a relay between said PLC and said switches.

9. The terminal table unit of claim 1 wherein said control device is adapted to monitor the number of times control signal based on said input data is switched on.

10. The terminal table unit of claim 1 wherein said control device is adapted to monitor cumulative length of time during which control signal based on said input data is switched on.

11. The terminal table unit of claim 3 wherein said memory device further serves to store basic data with specific patterns and said control device further serves to compare said input data with said basic data.

12. The terminal table unit of claim 8 wherein said switches include proximity switches.

13. The terminal table unit of claim 8 wherein said switches includes photoelectric switches.

14. The terminal table unit of claim 8 wherein said switches include abnormality-detecting switches.

* * * * *